United States Patent Office 3,391,334
Patented July 2, 1968

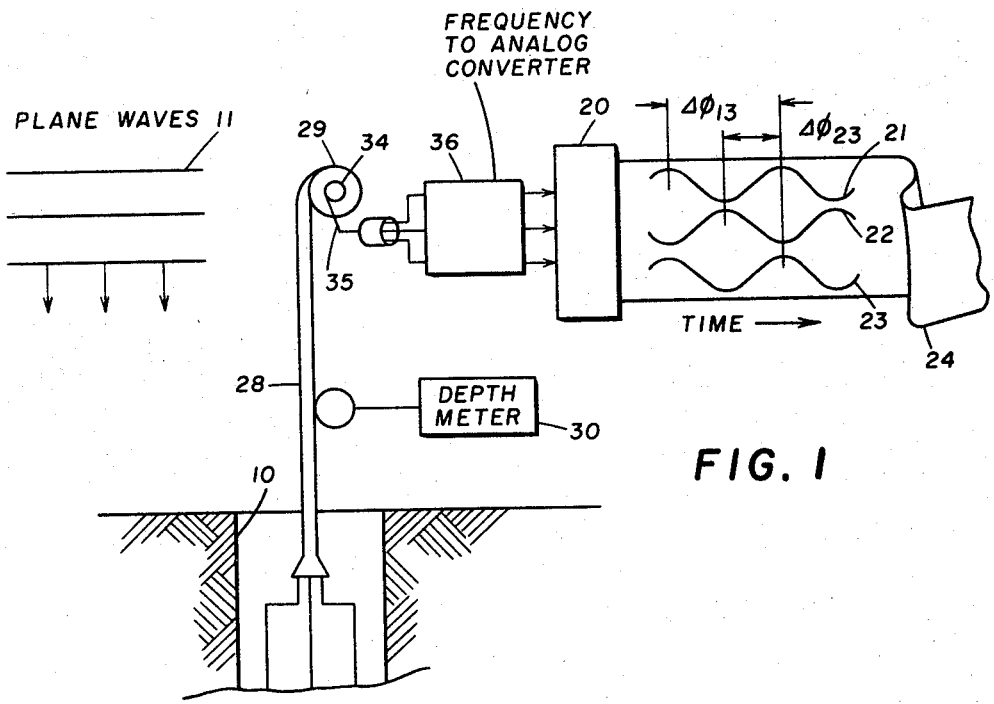
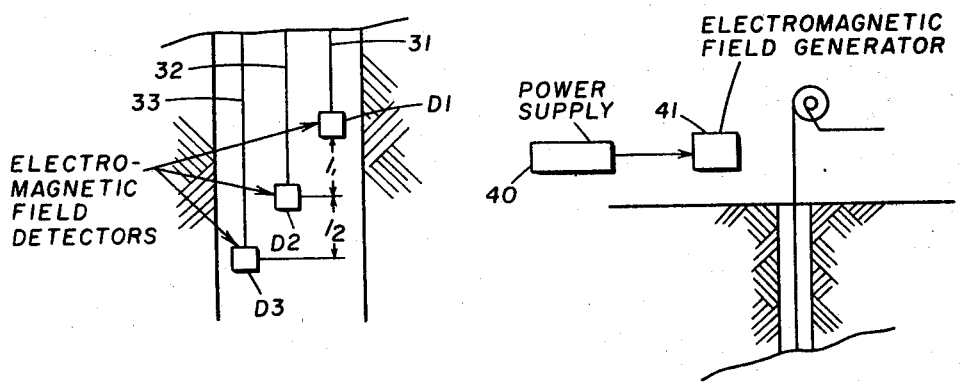
FIG. 1
FIG. 2
WILLIAM H. RUEHLE
INVENTOR

3,391,334
RESISTIVITY LOGGING BASED UPON ELECTROMAGNETIC FIELD MEASUREMENTS CARRIED OUT WITH THREE VERTICALLY SPACED DETECTORS
William H. Ruehle, Dallas, Tex., assignor to Mobil Oil Corporation, a corporation of New York
Filed Feb. 3, 1966, Ser. No. 524,701
8 Claims. (Cl. 324—8)

ABSTRACT OF THE DISCLOSURE

The specification discloses a technique for determining subsurface resistivity by simultaneously detecting in a borehole, with three vertically spaced detectors, an electromagnetic field propagating down from the surface and combining field measurements obtained with the three detectors to obtain a measure of resistivity. Preferably, three magnetic field detectors are employed to detect the time-varying micropulsation field. As an alternative, a source may be employed to generate an artificial field for detection in the borehole.

---

This invention relates to a technique for determining the resistivity of subsurface formations from measurements obtained of time varying electromagnetic fields and, more particularly, from field measurements obtained at three vertically spaced zones in a borehole.

In known methods of resistivity logging, measurements are made of the effective resistance of the formations to the flow of currents. Measurements of this type, however, tend to present a false reading of resistivity due to the effect of the mudcake and salt-water seepage into the formations.

Another type of technique proposed for determining resistivity utilizes the time varying micropulsation field and two spaced magnetic field detectors. The detectors are employed to obtain a measure of the phase difference of the field between two space points in order to obtain a measure of resistivity of the earth through which the field travels. The use of two detectors, however, does not account for the reflection of the field at subsurface interfaces.

In accordance with the present invention, there is provided a unique technique for determining subsurface resistance and free from the above-mentioned limitations. In this technique, at least three vertically spaced detectors are employed in a borehole to detect simultaneously an electromagnetic field propagating down from the surface to the detectors. Field parameters detected by the detectors and measured are combined to determine the resistivity of the formations between the three detectors. The parameters employed are the amplitude of the field detected by the three detectors as well as the phase of the field between at least two of the detectors.

For further objects and advantages of the present invention and for a more complete understanding thereof, reference may now be had to the following detailed description taken in conjunction with the accompanying drawing wherein:

FIGURE 1 illustrates a borehole logging system for carrying out the present invention; and FIGURE 2 illustrates an artificial source of electromagnetic waves.

Referring to FIGURE 1, three spaced magnetic field detectors $D_1$–$D_3$ positioned in a borehole 10 at known depths are employed for carrying out magnetic field measurements for determining the resistivity of the formations between the detectors. In carrying out the measurements, the detectors simultaneously detect, at three known locations, a downward traveling electromagnetic field, illustrated at 11, and preferably of low frequency and planar in character.

The outputs of the three detectors $D_1$–$D_3$ are applied to the surface to a recording system 20 where they are recorded as traces 21–23, respectively, on chart 24 driven as a function of time. The three traces represent the variation with time of the amplitude of the magnetic field detected by detectors $D_1$–$D_3$ at each of the three spaced locations. The magnetic field amplitude measured by the three detectors at a given instant of time as well as the phase of the field between the detectors provides sufficient information to permit one to determine the resistivity of the formations from three simultaneous equations as will become apparent from the following discussion. By obtaining three spaced field measurements, both transmission and deflection coefficients at a subsurface interface will be accounted for.

The source field utilized to obtain the desired measurements may be the micropulsation field which is predominantly of low frequency and planer in character. The plane waves of this field near the surface of the earth may be expressed in the well-known form:

$$e^{i(kz-\omega t)} \quad (1)$$

In the formations, a portion of these waves is transmitted and a portion reflected at each formation subsurface interface. The magnetic field component $H_y$ in a given layer may be expressed in the form:

$$H_y = \frac{1}{\eta}(Ae^{ikz} - Be^{-ikz})e^{-i\omega t} \quad (2)$$

wherein: A and B are constants (see, for example, Field and Waves in Modern Radio, Ramo Whinnery, second edition, 1953, chapter 7).

Equation 2 contains at a given frequency $f$, only three unknown parameters A, B, and a resistivity factor $\rho$, assuming that the intrinsic impedance $\eta$ of the formations and the wave number $k$ in the formations are defined as following in Equations 3 and 4:

$$\eta = \sqrt{\omega\mu\rho} \quad (3)$$

wherein:

$\omega = 2\pi f$, and
$\mu$=the permeability of the formations and may be considered equal to $4\pi \times 10^{-7}$ mks.

$$k = \frac{1+i}{\delta} \quad (4)$$

wherein $\delta$ is the attenuation distance.

The attenuation distance $\delta$ in turn may be defined as:

$$\delta = \sqrt{\frac{2}{\omega\mu\sigma}} \quad (5)$$

wherein $\sigma$ is the conductivity and hence is equal to $1/\rho$, the reciprocal of resistivity.

Thus, since only three unknowns are present in Equation 2, measurements of $H_y$ at three vertically separated and known locations permit one to determine A, B, and $\rho$, the latter of which is of importance in the present invention.

The magnetic field measurements obtained by the three detectors $D_1$–$D_3$ may be expressed in polar form, respectively, in the following manner:

$$H_1 = [H_1]e^{i\Phi_1} \quad (6)$$

$$H_2 = [H_2]e^{i\Phi_2} \quad (7)$$

$$H_3 = [H_3]e^{i\Phi_3} \quad (8)$$

wherein the bracketed terms are the magnitudes of the magnetic fields detected by the three detectors and the exponential terms are the phase angles.

Equations 6, 7, and 8 may be equated to the mathematically derived expressions for the magnetic field present at the three detectors to solve for $\delta$, and hence for the resistivity $\rho$.

$$H_1 = \frac{1}{\eta}(A - B) = [H_1]e^{i\Phi_1} \quad (9)$$

$$H_2 = \frac{1}{\eta}(Ae^{ikl_1} - Be^{-ikl_1})e^{-i\omega t} = [H_2]e^{i\Phi_2} \quad (10)$$

$$H_3 = \frac{1}{\eta}(Ae^{ikl_2} - Be^{-ikl_2})e^{-i\omega t} = [H_3]e^{i\Phi_3} \quad (11)$$

wherein $l_1$ and $l_2$ are the known distances between detectors $D_1$ and $D_1$ and between detectors $D_2$ and $D_3$, respectively.

One may obtain a solution for $\delta$ by taking the following ratios: $H_1/H_2$ and $H_2/H_3$. From these ratios, two ratios of $B/A$ may be derived and equated to obtain the following transcendental equation.

$$2\cos\frac{l_1}{\delta}\sinh\frac{l_1}{\delta} + \left[\frac{H_2}{H_3}\right]\left[e^{-\frac{l_2}{\delta}}\cos\left(\frac{l_2}{\delta} + \Delta\Phi_{23}\right) - e^{\frac{l_2}{\delta}}\cos\left(\frac{l_2}{\delta} - \Delta\Phi_{23}\right)\right] = \left[\frac{H_1}{H_3}\right]\left[e^{\frac{l_1-l_2}{\delta}}\cos\left(\frac{l_2-l_1}{\delta} + \Delta\Phi_{13}\right) - e^{-\frac{l_1-l_2}{\delta}}\cos\left(\frac{l_2-l_1}{\delta} - \Delta\Phi_{13}\right)\right] \quad (12)$$

wherein $\Delta\Phi_{23}$ is the phase angle of the magnetic field at detector $D_3$ with respect to detector $D_2$ and $\Delta\Phi_{13}$ is the phase angle of the magnetic field at detector $D_3$ with respect to detector $D_1$.

In obtaining Equation 12, Equation 4 was employed as well as the expression $$e^{i\Phi} = \cos\Phi + i\sin\Phi$$

Equation 12 may be solved for $\delta$ using an iterative procedure, the answer of which may be applied to Equation 5 to solve for the resistivity $\rho$. In solving Equation 12, the magnetic field magnitudes $[H_1]$, $[H_2]$, and $[H_3]$ and the phase angles $\Delta\Phi_{13}$ and $\Delta\Phi_{23}$ may be determined from measurements taken directly from chart 24 as can be understood by reference to FIGURE 1. This may be done assuming that the magnetic field measured is of a predominantly single frequency. In order to enhance the accuracy of this approach, narrow band pass filters may be coupled to the output of each of the detectors $D_1-D_3$. As an alternative procedure, Fourier analysis may be carried out with respect to the three traces 21–23 to determine the amplitude and phase angle values at a given frequency. This may be carried out with digital computers or by employing analogue analyzers, for example, of the type mentioned in U.S. Patent No. 2,696,891.

Referring again to FIGURE 1, there will be described in more detail the borehole logging system for carrying out the present invention as well as the manner of operation thereof. The three detectors $D_1-D_3$ extend from cable 28 and are positioned relative to each other at known distances defined by $l_1$ and $l_2$. The cable 28 is wound and unwound upon a drum 29. In carrying out borehole measurements, the cable 28 and hence the three detectors are lowered to a formation of interest, the depth of which may be determined from depth meter 30. This meter may measure the depth of the first detector $D_1$. At the depth of interest, the three detectors $D_1-D_3$ are employed to detect the time varying micropulsation field for a certain period of time. During this time, the output of the three detectors are recorded by recorder 20 on chart 24 driven as a function of time. Subsequent measurements are then carried out similarly at different depths.

In one embodiment, the three detectors $D_1-D_3$ may each be rubidium vapor type magnetometers, Model X-4936, available from Varian Associates, Palo Alto, Calif. The sensing head of these detectors, employed in the borehole, produces a signal having a frequency proportional to the magnetic field encountered. The signal output is amplified (by means not shown) and transmitted to the surface by way of cable conductors 31–33. At the surface, the signals from the three conductors are taken by way of slip rings and brushes (illustrated at 34 and 35) and applied to instrumentation 36. This instrumentation includes three frequency meters which convert the signal frequency of each detector to an analog voltage having a magnitude proportional to the output frequencies of the corresponding magnetometer and hence of the magnetic field detected thereby. The output of each of the frequency meters may be applied directly to recorder 20 for the production of traces 21–23, respectively. The output of the frequency meters alternatively may be applied to band pass filters as indicated previously prior to application to the recorder 20. As a further alternative, the frequency meter outputs may be applied to Fourier analyzers for the production of spectrums of amplitude and phase variation with frequency in order to determine the magnetic field amplitude and phase angle at each detector for a given frequency, as indicated previously.

As indicated previously, a source field predominantly of low frequency is preferred since greater penetration is obtainable and further the long wavelength thereof will allow resistivity measurements to be obtained unaffected by borehole parameters. In this respect, the micropulsation field is suitable since it contains strong frequency components below 1 c.p.s.

It is to be understood that an artificial source may be employed rather than the micropulsation field. Such a source is illustrated in block diagram in FIGURE 2 and comprises a variable power supply 40 coupled to a field generator 41 located near the borehole. The field generator 41 may comprise a long conductor having its longitudinal axis positioned parallel to the earth's surface or a loop antenna positioned with its axis parallel to the earth's surface. The use of an artificial source has advantages in that the frequency of the electromagnetic field generated can be controlled by power supply 40 to obtain frequencies different from that of the micropulsation field. Higher frequencies, for example, may be desirable in some instances to obtain better resolution in the resistivity measurements obtained.

In the above description, three vertically spaced field detectors were disclosed for detecting at three subsurface levels, downward traveling plane wave components for carrying out the invention. It is to be understood, however, that four vertically spaced magnetic field detectors may be employed to obtain the same information.

Electric field detectors comprising electrode pairs also may be employed instead of magnetic field detectors to obtain the desired information for determining resistivity. In this alternative, a pair of spaced apart electrodes will be located at least at each of three detecting subsurface levels to detect the horizontal electric field component of the downward traveling waves. Preferably, two adjacent boreholes will be employed with one electrode of each pair being located in one borehole at a certain level and the other electrode being located in the adjacent borehole at the same level. Thus, at least three pairs of electrodes will be employed to detect simultaneously the electric field component at least at three vertically spaced and known subsurface levels. The amplitude and phase differences will be combined in the same manner as described above; however, the disclosed equations will be modified by well-known constants defining the relationship between the E and H fields.

Now that the invention has been described, modifications will become apparent to those skilled in the art and it is intended to cover such modifications as fall within the scope of the appended claims.

What is claimed is:

1. A method of obtaining information useful in determining the resistivity of subsurface formations of interest comprising the steps of:

moving three detecting means to first subsurface detecting positions whereby said three detecting means are spaced apart vertically by known distances, said three detecting means comprising first, second, and third detecting means for detecting a field component of an electromagnetic field, at said first subsurface detecting positions and with said first, second, and third detecting means located at upper, middle, and lower levels, respectively, simultaneously detecting said field component of an electromagnetic field propagating down from the surface to said three detecting means, recording said field component detected by each of said three detecting means at said first subsurface detecting positions, subsequently moving said three detecting means to different subsurface detecting positions whereby said three detecting means are spaced apart vertically by known distances, at said different subsurface detecting positions and with said first, second, and third detecting means located at upper, middle, and lower levels, respectively, simultaneously detecting said field component of an electromagnetic field propagating down from the surface to said three detecting means, recording said field component detected by each of said three detecting means at said different subsurface detecting positions, from said field component detected by said three detecting means at said first subsurface detecting positions and recorded, determining field amplitudes and phase angles, from said field component detected by said three detecting means at said different subsurface detecting positions and recorded, determining field amplitudes and phase angles, combining said field amplitudes and phase angles determined from said field component detected at said first subsurface detecting positions and recorded to obtain an indication of the resistivity of the formations between said three detecting means at said first subsurface detecting positions, and combining said field amplitudes and phase angles determined from said field component detected at said different subsurface detecting positions and recorded to obtain an indication of the resistivity of the formations between said three detecting means at said different subsurface positions.

2. The method of claim 1 wherein:
said field amplitudes and phase angles of said field component determined and combined for each of said detecting positions include the field amplitudes of said field component detected by said three detecting means and the phase angles of said field component between said first and third detecting means and between said second and third detecting means.

3. The method of claim 1 wherein:
said field component detected is the electric field component of an electromagnetic field.

4. The method of claim 3 wherein:
said electric field component is detected at each of said subsurface detecting positions with three pairs of electrodes located in two spaced boreholes, one electrode of each pair being located in one borehole at a certain level and the other electrode being located in the other borehole at the same level, said three pairs of electrodes being spaced apart vertically at each of said subsurface detecting positions.

5. A method of determining a parameter related to the resistivity of subsurface formations of interest comprising the steps of:

inserting into a borehole three detectors comprising first, second, and third magnetic field detectors, moving said three detectors to first detecting positions within said borehole whereby said three detectors are spaced apart vertically by known distances, at said first detecting positions and with said first, second, and third detectors located at upper, middle, and lower levels, respectively, simultaneously detecting the magnetic field component of an electromagnetic field propagating down from the surface to said three detectors, recording said magnetic field component detected by each of said three detectors at said first detecting positions, subsequently moving said three detectors to different detecting positions within said borehole whereby said three detectors are spaced apart vertically by known distances, at said different detecting positions and with said first, second, and third detectors located at upper, middle, and lower levels, respectively, simultaneously detecting the magnetic field component of an electromagnetic field propagating down from the surface to said three detectors, recording said magnetic field detected by each of said three detectors at said different detecting positions, from said magnetic field component detected at said first detecting positions and recorded, determining the magnetic field amplitudes detected by said three detectors and the magnetic field phase angles between said first and third detectors and between said second and third detectors, respectively, from said magnetic field component detected at said different detecting positions and recorded, determining the magnetic field amplitudes detected by said three detectors and the magnetic field phase angles between said first and third detectors and between said second and third detectors, respectively, combining said field amplitudes and phases determined from the recordings obtained with said three detectors at said first detecting positions in the following manner to determine the attenuaion distance $\delta$ to obtain an indication of resistivity $\rho$ between said three detectors at said first detecting positions:

$$2 \cos \frac{l_1}{\delta} \sinh \frac{l_1}{\delta} + \left[\frac{H_2}{H_3}\right]\left[e^{-\frac{l_2}{\delta}} \cos\left(\frac{l_2}{\delta}+\Delta\Phi_{23}\right) - e^{\frac{l_2}{\delta}} \cos\left(\frac{l_2}{\delta}-\Delta\Phi_{23}\right)\right] = \left[\frac{H_1}{H_3}\right]\left[e^{\frac{l_1-l_2}{\delta}} \cos\left(\frac{l_2-l_1}{\delta}+\Delta\Phi_{13}\right) - e^{-\frac{l_1-l_2}{\delta}} \cos\left(\frac{l_2-l_1}{\delta}-\Delta\Phi_{13}\right)\right]$$

wherein:
[$H_1$], [$H_2$], and [$H_3$] are the magnetic field amtudes detected by said first, second, and third detectors, respectively, $l_1$ and $l_2$ are the distances between said first and second detectors and between said second and third detectors, respectively, and $\Delta\Phi_{13}$ and $\Delta\Phi_{23}$ are the magnetic field phase angles between said first and third detectors and between said second and third detectors, respectively, similarly, combining said field amplitudes and phases determined from the recordings obtained with said three detectors at said different detecting positions to determine the attenuation distance $\delta$ to obtain an indication of resistivity $\rho$ between said three detectors at said different detecting positions.

6. The method of claim 5 wherein:
said three detectors are spaced apart vertically, with respect to each other, at said different detecting positions by the same known distances that said three detectors are spaced apart vertically, with respect to each other, at said first detecting positions.

7. The method of claim 5 wherein:
the magnetic field detected and recorded is due to the natural time-varying electromagnetic field impinging the earth.

8. The method of claim 5 wherein:
the magnetic field detected and recorded is due to an electromagnetic field artificially generated at the surface of the earth.

References Cited

UNITED STATES PATENTS

| | | | |
|---|---|---|---|
| 2,996,657 | 8/1961 | Varian | 324—8 X |
| 3,052,835 | 9/1962 | Dunlap et al. | 324—6 X |
| 3,086,168 | 4/1963 | Buckner | 324—6 |
| 3,321,700 | 5/1967 | Zimmerman | 324—8 |

RUDOLPH V. ROLINEC, *Primary Examiner.*

G. R. STRECKER, *Assistant Examiner.*

UNITED STATES PATENT OFFICE
CERTIFICATE OF CORRECTION

Patent No. 3,391,334                                            July 2, 1968

William H. Ruehle

It is certified that error appears in the above identified patent and that said Letters Patent are hereby corrected as shown below:

Column 2, line 17, "deflection" should read -- reflection --; line 40, "following" should read -- follows --. Column 3, line 14, "$D_1$", second occurrence, should read -- $D_2$ --. Column 4, line 3, "outputi s" should read -- output is --. Column 6, line 40, "attenuaion" should read -- attenuation --; lines 50 to 53, that portion of the formula reading $\left(\frac{t_2 - \ell_1}{\delta} + \Delta\Phi_{13}\right)$ should read $\left(\frac{\ell_2 - \ell_1}{\delta} + \Delta\Phi_{13}\right)$ line 55, "am-" should read -- ampli- --.

Signed and sealed this 2nd day of December 1969.

(SEAL)
Attest:

EDWARD M. FLETCHER, JR.                        WILLIAM E. SCHUYLER, JR.
Attesting Officer                                     Commissioner of Patents